April 18, 1967 C. S. FUDALA 3,314,637
SEAT ADJUSTER MECHANICAL STRUCTURE
Filed Feb. 15, 1965 2 Sheets-Sheet 2

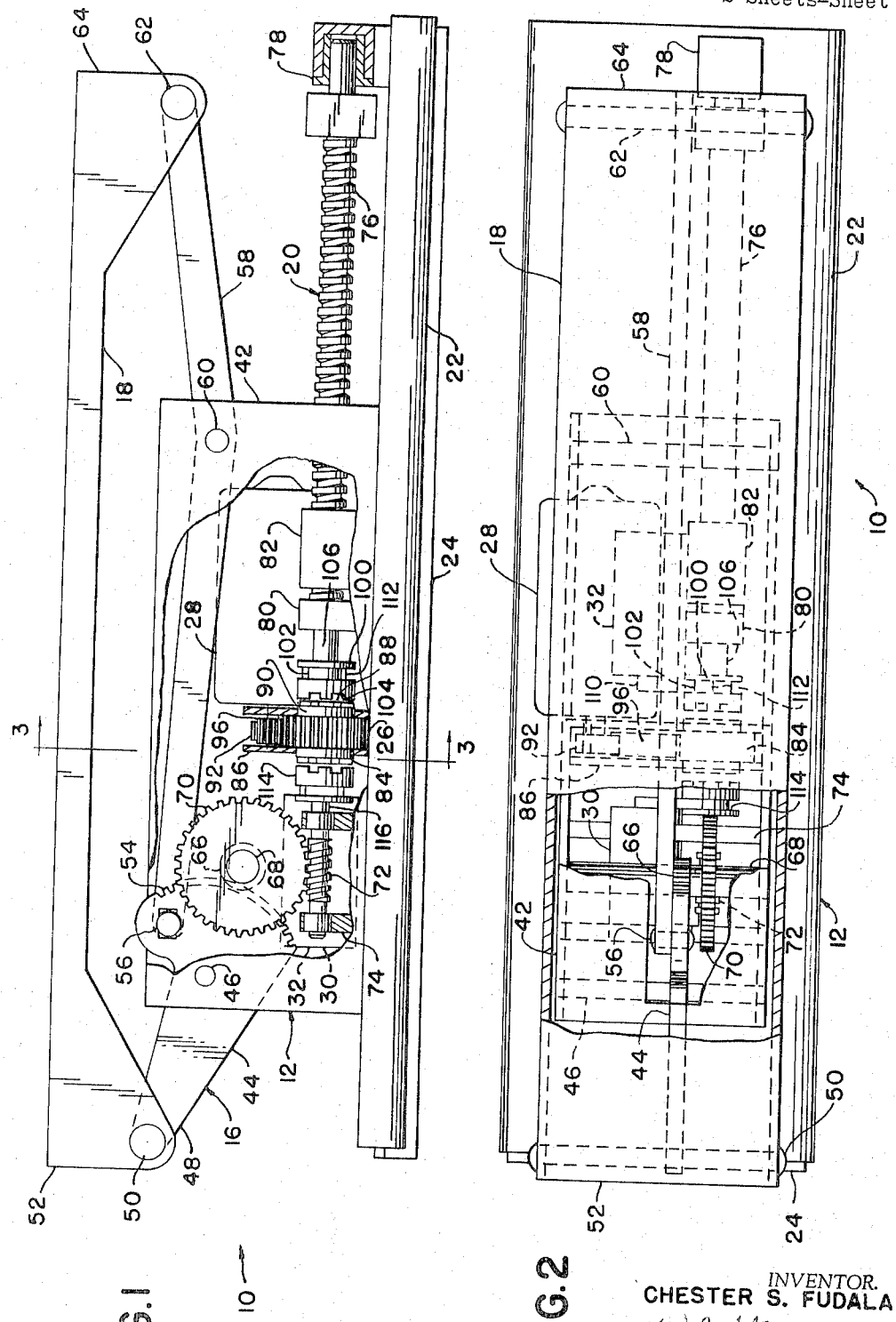

INVENTOR.
CHESTER S. FUDALA
BY *Whittemore,*
*Hulbert & Belknap*
ATTORNEYS

United States Patent Office 3,314,637
Patented Apr. 18, 1967

3,314,637
SEAT ADJUSTER MECHANICAL STRUCTURE
Chester S. Fudala, Detroit, Mich., assignor to Ferro Manufacturing Corporation, a corporation of Michigan
Filed Feb. 15, 1965, Ser. No. 432,660
7 Claims. (Cl. 248—419)

The invention relates to seat adjusters and refers more specifically to improved structure for moving the front and back of a seat up or down simultaneously and for moving the seat forward and backward.

In the past seat adjusters for automobiles and the like and in particular mechanical structures thereof have been complicated so that seat adjusters have been relatively expensive to produce. Wherein simple, economical seat adjusters have been provided in the past, they have either lacked the required versatility or they have performed inefficiently.

It is therefore an object of the present invention to provide an improved seat adjuster.

Another object is to provide a seat adjuster including a drive motor, mechanical structure including vertical movement mechanism for moving the front and rear of a seat up and down simultaneously and separate horizontal movement mechanism for moving the seat forward and backward and separate means for connecting each of the vertical and horizontal movement mechanisms to the motor.

Another object is to provide a seat adjuster as set forth above wherein the vertical movement mechanism for moving the front and rear of the seat up and down simultaneously comprises a centrally pivotally mounted first lever and a centrally pivotally mounted second lever pivoted together at one end by means of a lost motion connection, means for pivotally connecting the other ends of the levers to the front and rear of a seat supporting member and means for pivoting one of the levers about its pivot mounting.

Another object is to provide a seat adjuster as set forth above wherein the horizontal movement mechanism for moving the seat forward and backward comprises a screw and nut.

Another object is to provide a seat adjuster as set forth above wherein the means for connecting the mechanisms to the motor comprises clutch mechanism and a separate clutch actuating solenoid for each mechanism.

Another object is to provide a seat adjuster which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partially broken away elevation view of a seat adjuster constructed in accordance with the invention.

FIGURE 2 is a partially broken away top view of the seat adjuster illustrated in FIGURE 1.

With particular reference to the figures of the drawings, one embodiment of the present invention will now be considered in detail.

Figure 3:
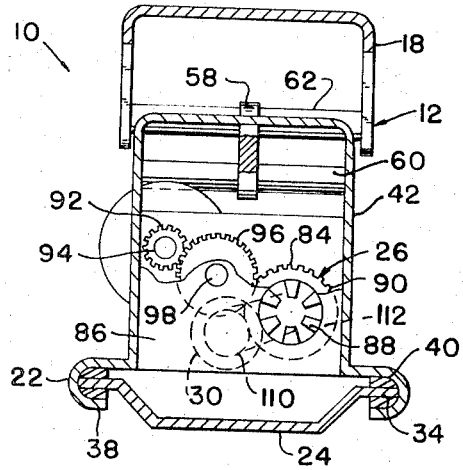
FIGURE 3 is a transverse cross section view of the seat adjuster illustrated in FIGURE 1 taken substantially on the line 3—3 in FIGURE 1.
Figure 4:
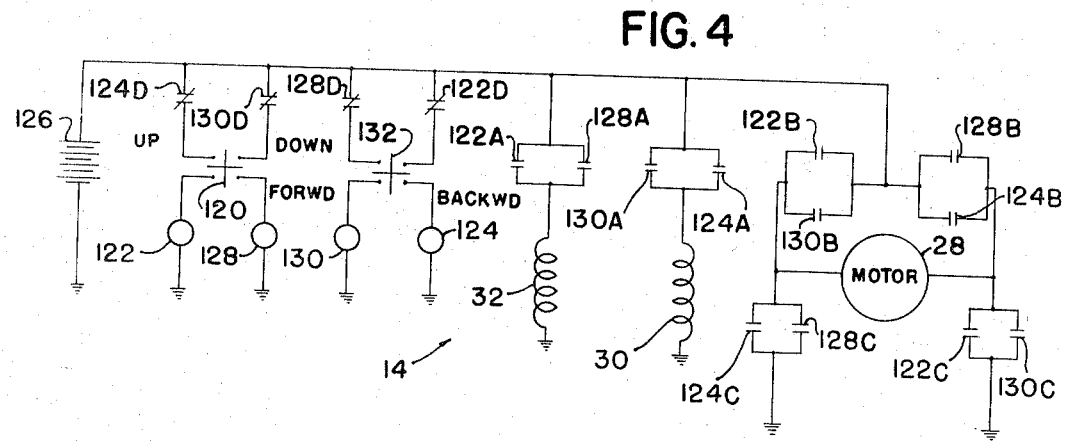
FIGURE 4 is a schematic of an electric circuit for use with the seat adjuster mechanical structure illustrated in FIGURES 1–3.

As shown best in FIGURE 1, the seat adjuster 10 includes the mechanical structure 12 which may be energized by the electric circuit 14, illustrated in FIGURE 4. The mechanical structure 12 includes the vertical movement mechanism 16 for moving the seat supporting member 18 up and down at both the front and rear simultaneously and the separate horizontal movement mechanism 20 for moving the slide 22 forward and backward along the track 24 on operation thereof. The mechanical structure 12 further includes the clutch mechanism 26. The electric circuit 14 includes the motor 28 and separate clutch solenoids 30 and 32 associated with horizontal and vertical movement of the seat supporting member 18 respectively.

In operation the vertical movement mechanism 16 is selectively connected to the motor 28 through clutch mechanism 26 on energization of solenoid 32 to move the seat supporting member 18 up or down in the front and rear simultaneously. The horizontal movement mechanism 20 is similarly connected to motor 28 through clutch mechanism 26 on energization of solenoid 30.

More specifically, the track 24 of the mechanical structure 12 may be secured to a floor (not shown) above which it is desired to adjustably support a seat on the seat supporting member 18 by convenient means (not shown). The track 24 is provided with the oppositely outwardly extending flanges 34. Slide 22 is provided with the open return edge portions 38 having bearing members 40 extending longitudinally thereof positioned therein. The flanges 34 of the track 24 are positioned between the bearing members 40 within the open return portions 38 of the slide 22 to permit guided longitudinal movement of the slide relative to the track 24.

Slide 22 includes the housing portion 42 positioned centrally thereof housing the vertical and horizontal movement mechanisms 16 and 20, the clutch mechanism 26, motor 28 and the solenoids 30 and 32. Other components of the electric circuit 14 may be included in the housing portion 42 of slide 22 if desired but are preferably positioned elsewhere adjacent a seat supported on the seat supporting member 18.

The vertical movement mechanism 16 includes the sector lever 44 pivotally mounted centrally thereof by pivot pin 46 on the housing portion 42 of slide 22. One end 48 of sector lever 44 is pivotally connected by pivot pin 50 to the front end 52 of the seat supporting member 18. The other end of the sector lever 44 includes the arcuate toothed sector portion 54 and is connected through a lost motion pivot connection 56 to one end of lever 58. The lever 58 is similarly pivotally mounted by pivot pin 60 in a fixed position on the housing portion 42 of the slide 22 and is connected at its other end by pivot pin 62 to the rear end 64 of the seat supporting member 18.

The arcuate toothed sector portion 54 of lever 44 is engaged with a pinion 66 rotatably mounted on a pin 68 carried by the housing portion 42 of slide 22. The pinion 66 is rigidly secured to a worm gear 70 for rotation therewith and the worm gear 70 is in mesh with a worm 72 supported on the slide 22 between the bearing supports 74 therefor. The worm 72 is rotatable by the motor 28 through clutch mechanism 26 as will be considered subsequently.

The horizontal movement mechanism 20 includes a screw 76 rotatably mounted in bearing supports 78 and 80 against axial movement with respect thereto. Bearing supports 78 and 80 are secured to the slide 22 in a fixed position thereon. Screw 76 is threaded through the nut 82 which is rigidly secured in a fixed position to the track 24. The screw 76 is rotated by the motor 28 through clutch mechanism 26 to move the slide 22 relative to the track 24 as will be considered subsequently.

The clutch mechanism 26 includes the annular clutch member 84 rotatably secured to the slide 22 between the mounting plates 86. Clutch member 84 has the lugs 88 on the opposite faces thereof and includes the gear teeth 90 around the outer periphery thereof. The clutch member 84 is rotated on actuation of motor 28 through pinion 92 secured to the motor drive shaft 94 and the speed reduction gear 96 supported for rotation between the plates 86 on the pin 98 and in mesh with both pinion 92 and the clutch member 84.

A clutch member 100 including an annular peripheral recess 102 and recesses 104 for receiving lugs 88 in the surface thereof adjacent the annular member 84 is secured to the unthreaded portion 106 of screw 76 for relative axial movement therealong and against relative rotation with respect thereto by convenient means, such as splines. When it is desired to move the seat forward or backward, the clutch member 100 is moved to the left to engage the lugs 88 on clutch member 84 in the recesses 104 by energizing the solenoid 32 having a core 110 including fingers 112 positioned in the annular recess 102 on the clutch member 100. A similar clutch member 114 is splined to the end 116 of the worm 72 for movement axially thereof on energization of the solenoid 30.

The over-all operation of the seat adjuster 10 will be considered in conjunction with the electric circuit 14 illustrated in FIGURE 4. Referring to FIGURE 4, when the up and down toggle switch 120 is, for example, moved to the left, the relay coil 122 is energized through the normally closed contacts 124A of relay coil 124 by battery 126. Energizing the relay coil 122 closes the normally open relay contacts 122A, 122B and 122C. Closing the relay contacts 122A energizes the solenoid 32, while closing the relay contacts 122B and 122C energizes the motor 28 to drive the clutch member 84 in a direction to rotate the clutch member 114 in a direction to produce clockwise movement of the lever 44 and movement of the seat supporting member 18 in an upward direction at both the front and rear simultaneously. The lever 44 and the lever 58 are prevented from binding during this upward movement by the lost motion connection 56 therebetween.

When the toggle switch 120 is moved to the right the relay coil 128 is energized through the normally closed relay contacts 130D. Engerizing the relay coil 128 again energizes the solenoid 32 through relay contacts 128A to engage the clutch members 114 and 84. At this time, however, the relay coil 128 causes the contacts 128B and 128C to be energized whereby the motor 28 is caused to rotate in an opposite direction to produce downward movement of the seat supporting member 18 through the levers 44 and 58, pinion 66, worm gear 70, worm 72, the engaged clutch members 114 and 84, gear 96 and pinion 92.

In a like manner, when the toggle switch 132 is moved to the left or right, the relay coils 130 or 124 respectively are energized through contacts 128D or 122D and cause the solenoid 30 to be energized through contacts 130A or contacts 124A. Energizing the solenoid 30 will cause the clutch member 100 to engage the clutch member 84 whereby the screw 76 may be rotated by the motor 28. Again the direction of the rotation of motor 28 is determined by which of the relay coils 130 or 124 are energized. The relay coil 130 will cause the contacts 130B and 130C to close whereby the motor 28 is energized in a direction to rotate the screw 76 with respect to the nut 82 and cause the seat supporting member 52 to move forward or to the left in FIGURE 1. Engerizing the relay coil 124 will cause the motor 28 to be energized through contacts 124B and 124C to rotate the motor 28 in a direction to move the seat supporting member 18 backward.

The relay contacts 122D, 124D, and 130D are provided to prevent closing contacts which would tend to energize the motor 28 for rotation in both directions at once, such as when forward and down or backward and up movement of the seat simultaneously is attempted. Due to the provision of contacts 122D, 124D, 128D and 130D when such simultaneous movement of the seat is attempted one of the relay coils 122, 124, 128 or 130 will be energized first due to manufacturing differences in the components of circuit 14 to prevent the corresponding relay coil from becoming energized until the toggle switch 120 or 132 associated with the first energized relay coil is released.

While one embodiment of the present invention has been considered in detail, it will be understood that other embodiments and modifications thereof are contemplated. Thus electric circuits both simpler and more complicated than that of FIGURE 4 may be provided to energize the motor 28 and the clutch solenoids 30 and 32 to produce desired movement of the mechanical structure 12 of the seat adjuster 10. It is the intention to include all embodiments and modifications of the disclosed invention as are defined by the appended claims within the scope of the invention.

What I claim as my invention is:

1. Seat adjuster mechanical structure including a seat supporting member having opposite ends, means connected to the opposite ends of the seat supporting member for moving the seat supporting member up and down on being driven in opposite directions, a track extending between the opposite ends of the seat supporting member, a slide positioned on said track for moving the seat supporting member horizontally on being driven along said track, motor means positioned centrally of said slide, carried thereby and including a pinion extending transversely thereof, first drive means extending parallel to the slide from one side of the pinion to one end of the slide and selectively engageable with the motor means for driving the slide relative to the track on engagement with the motor means, and second drive means extending parallel to the slide from the other side of the pinion toward the other end of the slide mounted on the slide and selectively engageable with the motor means for driving the means for moving the seat supporting member up and down on engagement with the motor.

2. Structure as set forth in claim 1 wherein the motor means comprises an electric motor extending parallel to said slide, the transversely extending pinion connected to and driven by the electric motor, a spur gear extending transversely to the slide in engagement with the pinion and a clutch member having clutch means on opposite sides thereof and gear teeth around the outer periphery thereof mounted for rotation about an axis extending parallel to the slide between the drive means with the gear teeth thereof in engagement with the spur gear.

3. Structure as set forth in claim 1 wherein the first drive means comprises a nut secured to said track, bearing abutments secured to said slide and means for driving the nut and bearing abutments relative to each other.

4. Structure as set forth in claim 3 wherein the means for driving the nut and bearing abutments relative to each other comprises a jack screw rotatably mounted in the bearing abutments and extending through the nut and clutch structure on one end of the jack screw selectively engageable with the motor means.

5. Structure as set forth in claim 1 wherein the second drive means includes a first lever, pivot means supporting the first lever centrally thereof, pivot means connecting one end of the first lever to one end of the seat supporting member, a second lever, pivot means supporting the second lever centrally thereof, pivot means connecting one end of the second lever to the other end of the seat supporting member, lost motion pivot structure connecting the other ends of the first and second levers together, the other end of said first lever having a toothed sector thereon, a pinion in mesh with the toothed sector and worm gear means connected to the pinion for driving the pinion.

6. Structure as set forth in claim 5 wherein the worm gear means comprises a worm gear, a worm separately rotatably mounted parallel to the slide in engagement with the worm gear, clutch structure secured to one end of the worm and means for selectively engaging the clutch structure with the motor means.

7. Seat adjuster mechanical structure comprising a track, a slide positioned on said track for movement therealong, a seat supporting member positioned over said track for movement with said slide and for movement vertically with respect to said slide, drive means for driving the slide relative to the track comprising a pair of bearing abutments secured to said slide, a nut secured to the track between the bearing abutments, a jack screw rotatably mounted in the bearing abutments and extending through the nut, clutch means secured to one end of the jack screw, drive means for driving the seat supporting member vertically with respect to said slide comprising a first lever, means pivotally mounting the first lever centrally, means pivotally mounting one end of the first lever to one end of the seat supporting member, a second lever, means for pivotally mounting the second lever centrally, means for pivotally mounting one end of the second lever to the seat supporting member at the other end thereof, lost motion pivot means connecting the other ends of the first and second levers together, a toothed sector on the other end of the first lever, pinion means engaged with the toothed sector, a worm gear connected to the pinion means for driving of the pinion means, a worm separately rotatably mounted on the slide and parallel thereto engaged with the worm gear and clutch means secured to one end of the worm, and motor means secured to the slide centrally thereof including an electric motor, a pinion driven by the electric motor, a spur gear in mesh with and driven by the pinion extending axially parallel to the slide and transversely thereof and clutch means having opposite faces engageable with the clutch means of the drive means for driving the slide relative to the track and the seat supporting member vertically with respect to the slide separately rotatably mounted centrally of the slide between the clutch structures on the ends of the jack screw and worm having a toothed circumference engaged with and driven by said spur gear.

References Cited by the Examiner

UNITED STATES PATENTS

| | | | |
|---|---|---|---|
| 131,981 | 10/1872 | Vosburgh | 74—102 X |
| 1,762,046 | 6/1930 | Blumenberg | 248—421 |
| 2,919,744 | 1/1960 | Tanaka | 297—347 X |
| 2,983,307 | 5/1961 | Meyer | 248—419 |
| 3,079,118 | 2/1963 | Pickles | 248—420 |
| 3,188,044 | 6/1965 | Epple | 248—419 |
| 3,212,747 | 10/1965 | Hansen et al. | 248—419 |

CLAUDE A. LEROY, *Primary Examiner.*

R. P. SEITTER, *Assistant Examiner.*